US009817279B2

(12) United States Patent
Chen et al.

(10) Patent No.: US 9,817,279 B2
(45) Date of Patent: Nov. 14, 2017

(54) DISPLAY DEVICE

(71) Applicant: InnoLux Corporation, Miao-Li County (TW)

(72) Inventors: Yu-Wei Chen, Miao-Li County (TW); Meng-Chieh Chang, Miao-Li County (TW); Chia-Liang Hung, Miao-Li County (TW)

(73) Assignee: INNOLUX CORPORATION, Miao-Li (TW)

( * ) Notice: Subject to any disclaimer, the term of this patent is extended or adjusted under 35 U.S.C. 154(b) by 351 days.

(21) Appl. No.: 14/619,216

(22) Filed: Feb. 11, 2015

(65) Prior Publication Data

US 2015/0271482 A1 Sep. 24, 2015

(30) Foreign Application Priority Data

Mar. 19, 2014 (TW) .............. 103110265 A

(51) Int. Cl.
G02F 1/1334 (2006.01)
G02F 1/1343 (2006.01)
F21V 8/00 (2006.01)
H04N 13/04 (2006.01)
G02F 1/1347 (2006.01)
G02B 27/22 (2006.01)

(52) U.S. Cl.
CPC ..... *G02F 1/134309* (2013.01); *G02B 6/0043* (2013.01); *G02B 27/2214* (2013.01); *G02F 1/13476* (2013.01); *H04N 13/0411* (2013.01); *H04N 13/0452* (2013.01); *G02B 6/0055* (2013.01); *G02F 1/1334* (2013.01)

(58) Field of Classification Search
CPC ... G02F 1/1334; G02F 1/1343; G02B 6/0033; H04N 13/0402
See application file for complete search history.

(56) References Cited

U.S. PATENT DOCUMENTS

| 5,779,337 | A | 7/1998 | Saito et al. | |
| 9,257,063 | B2* | 2/2016 | Takahashi | .......... H04N 13/0411 |
| 9,323,066 | B2* | 4/2016 | Bae | ..................... H04N 13/0497 |
| 9,411,080 | B2* | 8/2016 | Katagiri | .................. G06F 3/041 |
| 9,462,261 | B2* | 10/2016 | Sung | .................. G02B 27/2214 |
| 2012/0195072 | A1* | 8/2012 | Minami | ................ G02F 1/1336 |
| | | | | 362/613 |
| 2014/0300528 | A1* | 10/2014 | Ebisui | ................ G02B 27/2214 |
| | | | | 345/32 |

FOREIGN PATENT DOCUMENTS

| CN | 101526674 A | 9/2009 |
| CN | 102207576 A | 10/2011 |
| CN | 102385195 A | 3/2012 |

(Continued)

Primary Examiner — Timothy L Rude
(74) Attorney, Agent, or Firm — Bacon & Thomas, PLLC

(57) ABSTRACT

The present invention relates to a display device, comprising: a display unit comprising a pixel layer; a backlight unit; and a modulation unit disposed between the display unit and the backlight unit, wherein the modulation unit comprises a plurality of conductive layers and a liquid crystal layer disposed between the plurality of conductive layers, and the liquid crystal layer comprises a polymer dispersed liquid crystal (PDLC) or a polymer stabilized liquid crystal (PSLC).

17 Claims, 10 Drawing Sheets

(56) References Cited

FOREIGN PATENT DOCUMENTS

| | | | |
|---|---|---|---|
| TW | 200530675 | A | 9/2005 |
| TW | 200827781 | A | 7/2008 |
| TW | 200949293 | A | 12/2009 |
| TW | 200949353 | A | 12/2009 |
| TW | 201316057 | A | 4/2013 |
| TW | 201341915 | A | 10/2013 |
| TW | 201348748 | A | 12/2013 |
| TW | 201400882 | A | 1/2014 |

* cited by examiner

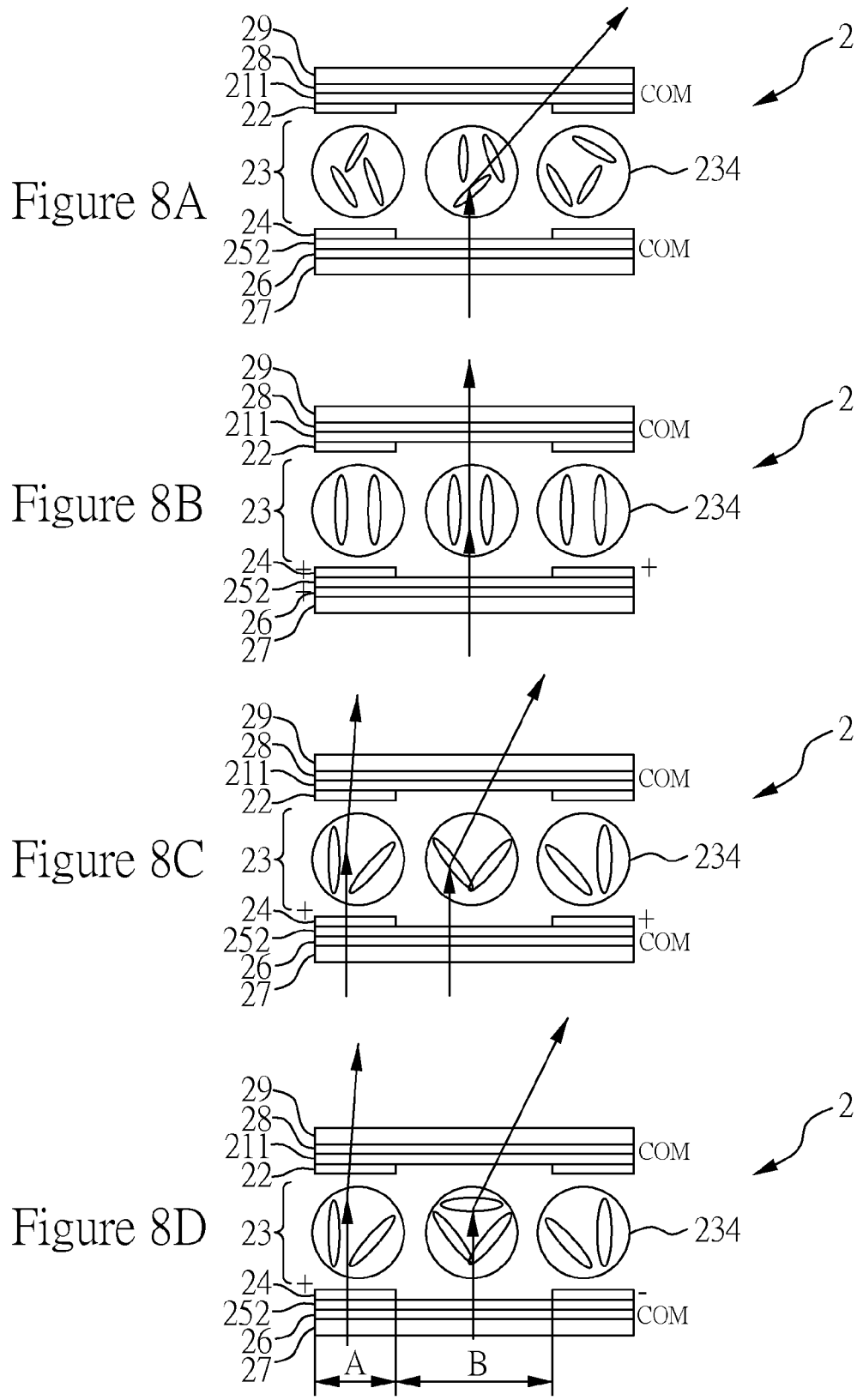

DISPLAY DEVICE

CROSS REFERENCE TO RELATED APPLICATION

This application claims the benefits of the Taiwan Patent Application Serial Number 103110265, filed on Mar. 19, 2014, the subject matter of which is incorporated herein by reference.

BACKGROUND OF THE INVENTION

1. Field of the Invention

The present invention relates to a display device, and especially to a display device able to switch between two dimensional (2D) and three dimensional (3D) images.

2. Description of Related Art

Human beings perceives the images of the real world through the prospects sensed by eyes, and the human brain will further form a so-called 3-dimension (3D) images according to the difference in spatial distance between two prospects seen by eyes from different angles. In general, three-dimensional display device is to simulate the vision of human eyes from different angles, to allow the viewer to perceive a three-dimensional image when viewing a two-dimensional image.

The current three-dimensional display devices are mainly divided into two categories, auto-stereoscopic display and non-auto stereoscopic display. A user of the auto-stereoscopic display device can see three-dimensional images without additionally wearing special glasses, also known as naked eye three-dimensional technology. On the contrary, as for another non-auto stereoscopic display device, a user needs special glasses to see three-dimensional images.

Common auto-stereoscopic displays devices comprise: a parallax barrier display device, a spatial sequential display device, and a time sequential display device. The parallax barrier display device is operated by a non-transmission parallax barrier to allow the user's left and right eye to see images with parallax which will form a three-dimensional impression in the brain. The spatial sequential display device is operated by using a parallax barrier which does not function with time to allow the left and right eyes to see a different set of pixels, which give the left and right eyes signals respectively, and then let the eyes see a different image, which, however, has a drawback of a reduced resolution. The time sequential display device is operated by using a parallax barrier which functions with time and synchronously driven with the display panel, so that the eyes see the same set of pixels at different times, and the set of pixels gives the left and right eyes signals respectively at different times, thereby allowing the two eyes to see different images.

In recent years, the demand for 3D display devices gradually increase, and to cope with the market demand, what is needed is a display device which can switch between 2D and 3D images, to allow the observer to select the desired viewing mode conveniently.

SUMMARY OF THE INVENTION

An object of the present invention is to provide a display device able to switch between two dimensional (2D) and three dimensional images (3D) according to the observer's requirements.

To achieve the above object, the present invention provides a display device, comprising: a display unit comprising a pixel layer; a backlight unit; and a modulation unit disposed between the display unit and the backlight unit, wherein the modulation unit comprises a plurality of conductive layers and a liquid crystal layer disposed between the plurality of conductive layers, and the liquid crystal layer comprises a polymer dispersed liquid crystal (PDLC) or a polymer stabilized liquid crystal (PSLC).

In the display device of the present invention, the applied voltage is adjusted, so that the light from the backlight unit can show a two-dimensional (2D) or three-dimensional (3D) image in a scattering or penetration manner, through modulation of the liquid crystal layer. Further, in the case that the backlight unit comprises a light emitting element and the light guide plate, stripe patterns may be further provided on the light guide plate, and unevenness in lighting efficiency of the light guide plate may be improved by adjusting the width and spacing of the stripe patterns, and the visual unevenness when viewing the display may be solved at the same time. In the operation of the device, the form of emitting light may be effectively regulated by adjusting the applied voltage scale, the type of the electrode pattern in the modulation unit, and the haze value of the liquid crystal layer, to thereby show two-dimensional (2D) or three-dimensional (3D) images. Further, in the side light source display device, a reflective layer can be further disposed on a surface of the light guide plate, to reduce the penetration of light without being reflected by the stripe patterns on the light guide plate, so as to effectively increase the lighting efficiency. Alternatively, in the case that the backlight unit utilizes a planar light source, a barrier layer may be further disposed between the liquid crystal layer and the backlight unit, to selectively shield the light from the backlight unit. Also, the modulation unit and the display unit may use a common substrate, or the modulation unit and the backlight unit may use a common substrate, to reduce the weight of the device and the cost of the substrate. In summary, the display device of the present invention can switch between two-dimensional (2D) and three-dimensional (3D) images, and can be applied to any display devices, such as: an automotive display, a video game equipment, a display for household appliances, a display for instrument, and a notebook computer, etc. Accordingly, the display device of the present invention can allow observers to conveniently select a desired viewing mode, and easily enhance the viewing pleasure.

BRIEF DESCRIPTION OF THE DRAWINGS

FIGS. 8A and 8D show the schematic diagrams of the modulation unit according to further another preferable embodiment of the present invention.

DETAILED DESCRIPTION OF THE PREFERRED EMBODIMENT

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention, and those skilled in the art will appreciate that various modifications, additions and substitutions are possible.

[Embodiment 1]

Figure 1A:
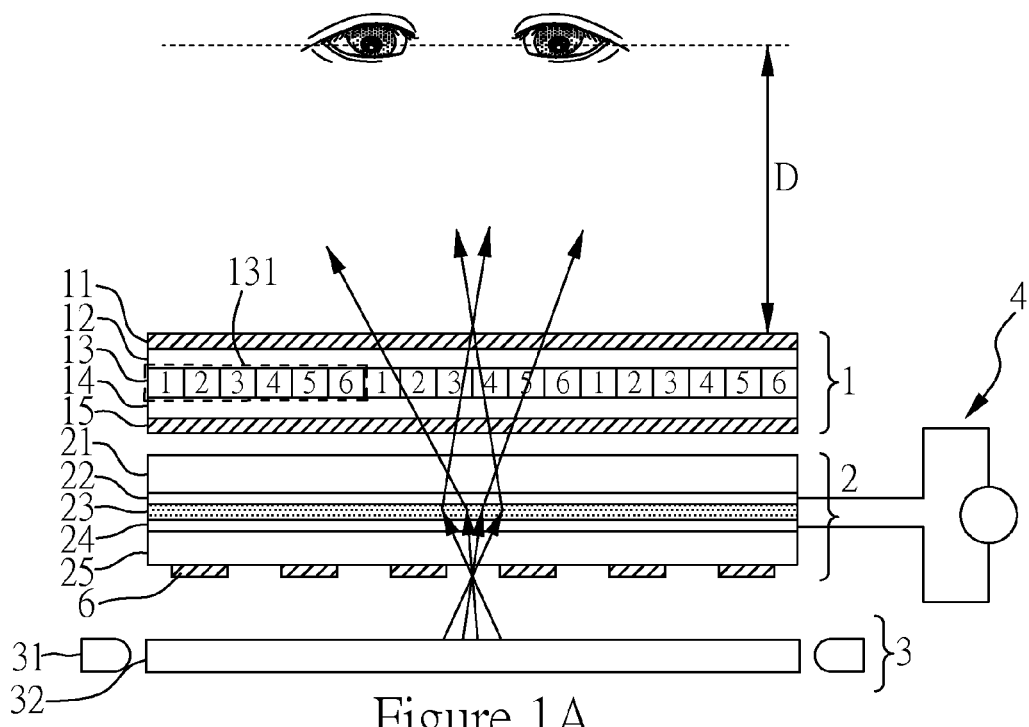
FIGS. 1A and 1B show the schematic diagrams of the display device according to a preferable embodiment of the present invention.

FIG. 1A shows a schematic diagram of the display device according the present invention. The display device includes: a display unit 1, a modulation unit 2, and a backlight unit 3, and the modulation unit 2 is provided between the display unit 1 and the backlight unit 3. The display unit 1 sequentially includes: a first polarizer 11, a first substrate 12, a pixel layer 13, a second substrate 14 and a second polarizer 15; the modulation unit 2 sequentially includes: a third substrate 21, a first conductive layer 22, a liquid crystal layer 23, a second conductive layer 24, a fourth substrate 25 and a barrier layer 6; the backlight unit 3 includes a light emitting element 31 and a light guide plate 32, wherein the light emitting element 31 is disposed on both sides of the light guide plate 32.

In the present invention, the display unit 1 is not limited. For example, the display unit 1 can be a common liquid crystal display unit (LCD) or an organic light emitting diode display unit (OLED). The pixel layer 13 comprises a plurality of pixel units 131, and when the display unit is a liquid crystal display unit, the plurality of pixel units 131 includes relative driving electrode, driving circuit, switching element, passive component, color filter or liquid crystal. Although a pixel unit 131 including six sub-pixel units is used herein, the present invention is not limited thereto. The object of the display device according to this embodiment can be achieved as long as the pixel unit 131 includes three or more sub-pixels.

The liquid crystal layer of the modulation unit 23 may contain the polymer dispersed liquid crystal (PDLC) or the polymer stabilized liquid crystal, PSLC), wherein the polymer dispersed liquid crystal (PDLC) includes a plurality of liquid crystal droplets having optical anisotropy uniformly dispersed in the polymer network. Polymer stabilized liquid crystal (PSLC) also includes liquid crystals having optical anisotropy uniformly dispersed in a polymer of a relatively low concentration. In general, a cholesteric liquid crystal is used in the polymer stabilized liquid crystal, which can possess bistable states of the bright state and the dark state without an applied voltage. In this embodiment, the liquid crystal layer of the modulation unit 23 contains the polymer dispersed liquid crystal (PDLC), and the matching relationship of the refractive index between the liquid crystal and the polymer in the liquid crystal layer 23 can be achieved by adjusting the applied voltage, such that the manner of the light emission from the backlight unit 3 can switch between scattering and penetration.

The barrier layer 6 may be made of any conventional black matrix materials or a metallic material having a good conductivity. The structure of the barrier layer 6 is generally fence-like, straight structure for selectively shielding the light from the backlight unit 3. Accordingly, the installation position of the barrier layer 6 is not particularly limited. In the present embodiment, the barrier layer 6 is disposed between the liquid crystal layer 3 and a backlight unit 23, on the light entrance surface of the fourth substrate 25 (on the side near the backlight unit 3), and the other installation positions can be easily deduced by the person skilled in the art. For example: the installation position can be on the light entrance surface of the second conductive layer 24 of the light modulation unit 2; on the bottom surface of the light guide plate 32 of the backlight unit 3; and the so on.

Also, the backlight unit 3 is not limited, as long as it emits light and provides light sequentially to the modulation unit 2, the display unit 1, and finally to the observer's eyes. Therefore, the backlight unit 3 may be any conventional luminous bodies, and preferably a luminous form able to provide alternate light and dark, that is, a luminous body able to emit non-planar light, such as point and line lights, for example, an active-matrix or a passive matrix of organic light-emitting diodes. However, a planar light source able to emit uneven luminance which presents a visual effect of alternate light and dark may also be used for the present invention. In this embodiment, the backlight unit 3 includes a light emitting element 31 and a light guide plate 32, and the light emitted by the light emitting element 31 is incident into the light guide plate 32 and then emits out. The light emitting elements 31 may be composed of a plurality light emitting diodes (LED), and utilized in the invention in the forms of single side light incidence, both sides light incidence, or entire surface light incidence. In this embodiment, the light emitting element 31 is disposed on the both sides of the light guide plate 32 to lighting in the form of both sides light incidence.

In addition, in the display device of the present invention, the first substrate 12, the second substrate 14, the third substrate 21, the fourth substrate 25, the first polarizer 11, the second polarizer 15 and the guide plate 32 can be made of general conventional materials. The substrate and the light guide plate may be a transparent material with high transmittance such as glass, plastic, and an acrylic resin, etc. The polarizer can be a film which adjusts the light polarization direction, such as a polyvinyl alcohol film (PVA) and a cellulose triacetate film (TAC), etc., and the detail of which will not be described here. In this embodiment, the first substrate 12 is a color filter (CF) glass substrate, while the second substrate 14 is a thin film transistor (TFT) glass substrate.

In the present invention, the first conductive layer 22 and the second conductive layer 24 may be made of a conventional common electrode material in the art, such as indium tin oxide (ITO), indium zinc oxide (IZO), other transparent conductive thin film materials (transparent conductive oxide, TCO) or the like. The conductive layer may be patterned by the exposure and development techniques, and may be patterns of an in-plane switching (IPS) type, a fringe field switching (FFS) type, a twisted nematic (TN) type, a vertical alignment (VA) type and so on, to regulate the light pattern and the view angle distribution.

Figure 1B:
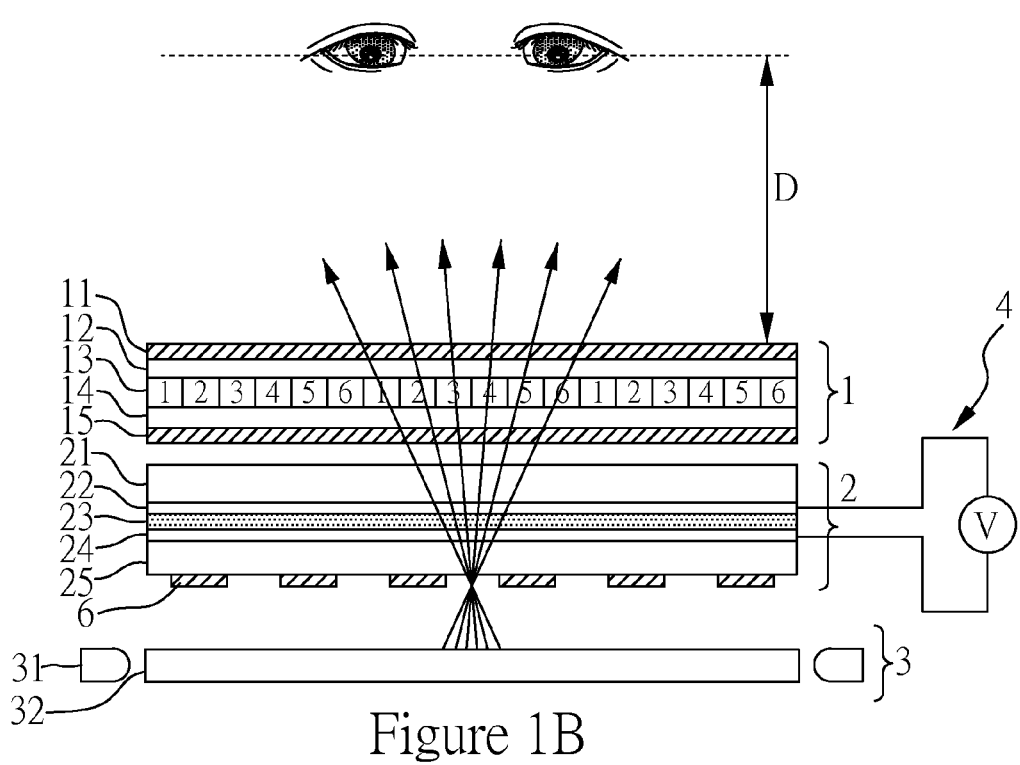

In the display device of the present invention, the state of the light traveling through the modulation unit 2 from the backlight unit 3 may be adjusted by applying a voltage (as shown in FIGS. 1A and 1B, voltage apply unit 4). Referring to FIG. 1A, in the case that the applied voltage is less than the threshold voltage (Vth) of the liquid crystal layer 23 or no voltage is applied, after the light (as shown by arrow) from the backlight unit 3 travels through the liquid crystal layer 23 of the modulation unit 2, the light arrives the display unit 1 in a scattering manner and then emits out, so that the observer receives a two-dimensional (2D) plane image. On the other hand, referring to FIG. 1B, in the case that a voltage is applied, after the light (as shown by arrow) from the backlight unit 3 travels through the liquid crystal layer 23, the light arrives the display unit 1 in a penetration manner and then emits out, so that the observer receives a three-dimensional (3D) stereoscopic image. Accordingly, the display device of the present invention can effectively switch between the two-dimensional (2D) and the three-dimensional (3D) images, and can be applied to any display devices, such as: an automotive display, a video game equipment, a display for household appliances, a display for instrument, and a notebook computer, etc., allowing observers to conveniently select a desired viewing mode, and easily enhancing the viewing pleasure.

The distance between the pixel layer 13 and the backlight unit 3 of the display unit 1 is preferably 0.5 to 4 mm. When the distance between the pixel layer 13 and the backlight unit 3 falls within the range described above, the observer can have a better image quality. In this embodiment, the distance (D) between the observer's eye and the display unit 1 preferably satisfies the following Equation 1:

$$D = \left(\frac{eye}{SPP} - 1\right) / \left(\frac{LC}{n_{LC}} + \frac{TFT1}{n_{TFT}} + \frac{pol.2}{n_{pol.}} + \frac{air}{n_{air}} + \frac{PDLC}{n_{PDLC}}\right)$$ [Equation 1]

wherein, eye represents the distance between the observer's eyes, SPP represents the pitch of the sub-pixels, LC represents the distance that light travels through the liquid crystal layer, $n_{LC}$ represents the refractive index of the liquid crystal layer, TFT1 represents the thickness of the second substrate (in this case, an organic film transistor glass substrate), $n_{TFT}$ represents the refractive index of the second substrate, pol.2 represents the thickness of the second polarizer, npol. represents the refractive index of the second substrate, air represents the distance between the display unit and the modulation unit, $n_{air}$ represents the refractive index of air, PDLC represents the thickness of the liquid crystal layer, $n_{PDLC}$ represents the refractive index of the liquid crystal layer.

For example, in the case that the distance between the observer's eyes is 32.5 mm, when the distance between the pixel layer 13 and the backlight unit 3 is 0.8386 mm, the distance (D) between the observer's eye and the display unit 1 is 60 mm. When the distance between the pixel layer 13 and the backlight unit 3 is 2.5036 mm, the distance (D) between the observer's eye and the display unit 1 is 3313 mm. Alternatively, in the case that the distance between the observer's eyes is 65 mm, when the distance between the pixel layer 13 and the backlight unit 3 is 0.8386 mm, the distance (D) between the observer's eye and the display unit 1 is 120 mm. When the distance between the pixel layer 13 and the backlight unit 3 is 2.5036 mm, the distance (D) between the observer's eye and the display unit 1 is 6727 mm. In detail, the values satisfying Equation 1 are summarized in Table 1 below:

TABLE 1

| D | SPP | LC | TFT1 | pol.2 | air | PDLC |
|---|---|---|---|---|---|---|
| 60 | 0.2479 | 0.0036 | 0.2 | 0.135 | 0.1 | 0.2 |
| 3313 | 0.018 | 0.0036 | 0.7 | 0.2 | 0.5 | 1.1 |
| 120 | 0.2479 | 0.0036 | 0.2 | 0.135 | 0.1 | 0.2 |
| 6727 | 0.018 | 0.0036 | 0.7 | 0.2 | 0.5 | 1.1 |

Unit: mm

[Embodiment 2]

Figure 2A:
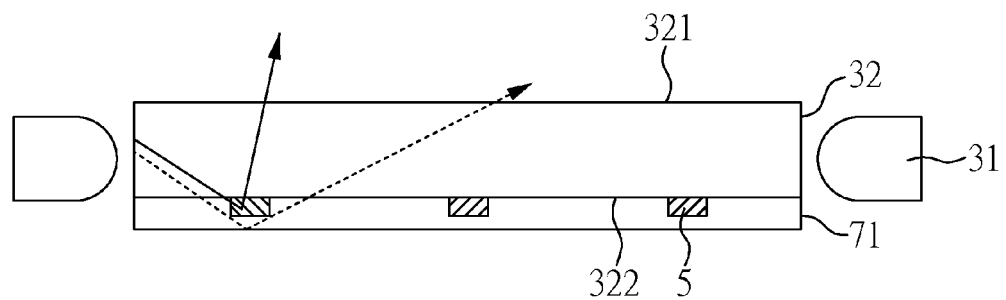
FIGS. 2A, 2B show the schematic diagrams of the backlight unit according to a preferable embodiment of the present invention.
Figure 2B:
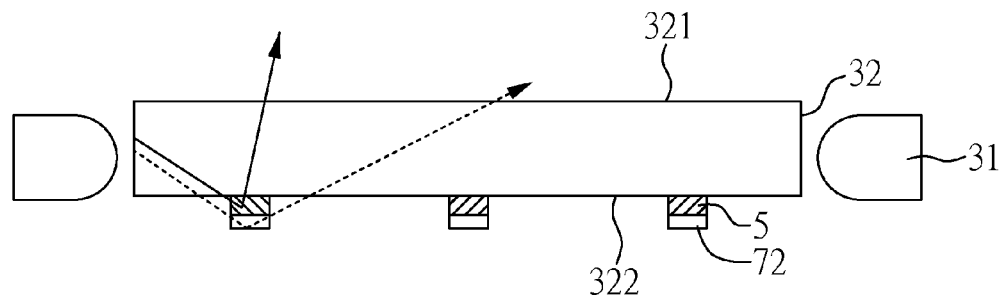

The backlight unit of the display device according to the present invention is described in detail below. Referring to FIGS. 2A and 2B, which show two embodiments that a plurality of stripe patterns 5 and reflective layers 71, 72 are disposed on the backlight unit 3. The backlight unit 3 includes a light emitting element 31 and a light guide plate 32, and the light emitting element 31 is disposed on the both sides of the light guide plate 32 (light entrance surface), wherein the light guide plate has a first surface 321 (light exit surface) and a second surface 322 (bottom surface) opposite thereto, and the first surface 321 is adjacent to the modulation unit (not shown). A plurality of stripe patterns 5 are disposed on the second surface 322 of the light guide plate 32. As shown in FIG. 2A, the reflective layer 71 may be disposed on the second surface 322, and cover the second surface 322 and the plurality of the stripe patterns 5; or as shown in FIG. 2B, the reflective layer 72 may be disposed only on the plurality of the stripe patterns 5 and cover the plurality of the stripe patterns 5.

Here, the material of the plurality of the stripe patterns 5 is not particularly limited, and may be any materials able to avoid total reflection.

For example, the plurality of the stripe patterns 5 may be made of a composite formed of titanium dioxide ($TiO_2$) and ink or a photoresist. Further, the reflective layers 71, 72 may be a metal layer having a single layer or multilayer structure, and preferably a layer having a high reflectivity, such as silver (Ag) or aluminum (Al) layer. However, the present invention is not limited thereto. Furthermore, in the present embodiment, although the plurality of stripe patterns 5 are disposed directly on the light guide plate 32, grooves may also be formed on the light guide plate 32, with the plurality of stripe patterns 5 embedded in the grooves.

Thus, a portion of the light emitted from the light emitting element 31 (as shown by the solid line arrow) arrives the plurality of stripe patterns 5 and is reflected to the first surface 321 to emit out, while a portion of the light emitted from the light emitting element 31 (as shown by the dashed arrow) penetrates the second surface 322 and is reflected by the reflective layers 71, 72 to the first surface 321 to emit out. It can reduce the penetration of light without being reflected by the stripe patterns 5 through the second surface, so as to effectively increase the lighting efficiency.

[Embodiment 3]

Figure 3:
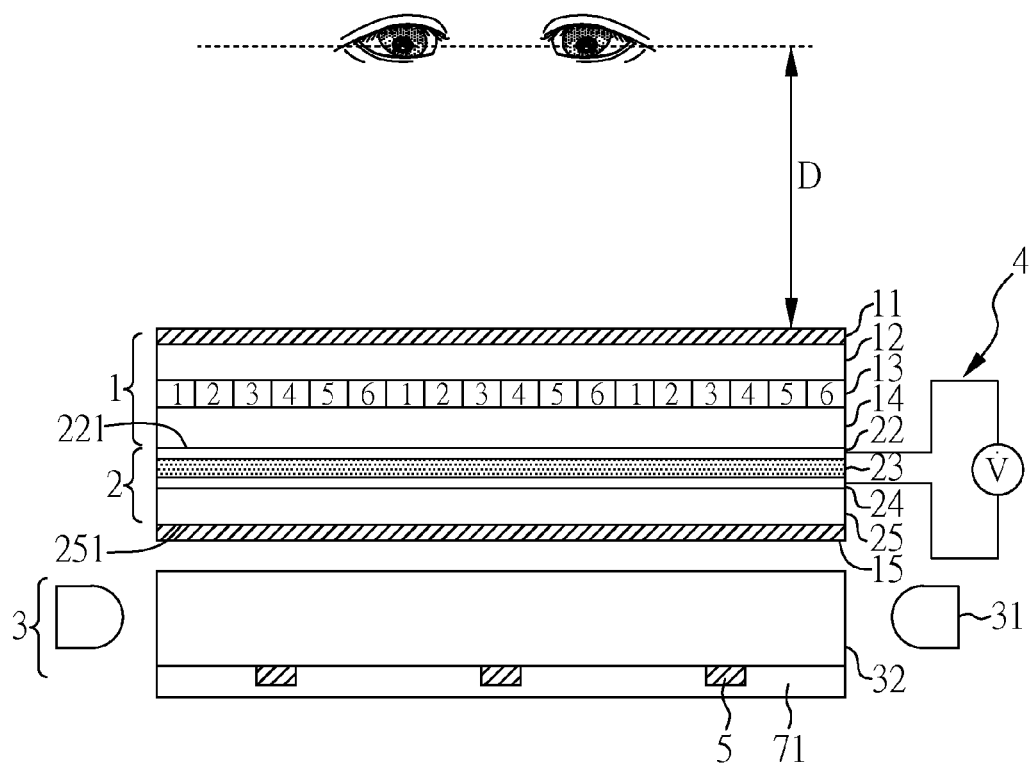
FIG. 3 shows a schematic diagram of the display device according to another preferable embodiment of the present invention.

Referring to FIG. 3, which shows a schematic diagram of the display device according to another preferable embodiment of the present invention. In the present embodiment, the installation of a substrate can be omitted due to the combination of the display unit 1 and the modulation unit 2. In detail, the display unit 1 sequentially comprises: a first polarizer 11, a first substrate 12, a pixel layer 13 and a second substrate 14. The modulation unit 2 sequentially comprises: a first conductive layer 22, a liquid crystal layer 23, a second conductive layer 24, a fourth substrate 25 and a second polarizer 15. Accordingly, the display unit 2 and the modulation unit 14 use a common second substrate. In Embodiment 1, the third substrate 2 contained in the modulation unit 21 may be omitted, to reduce the weight of the device and the cost of the substrate. In addition, the backlight unit 3 of the present embodiment is the same as in FIG. 2A, and is not repeated here.

In this embodiment, the display unit is a liquid crystal display unit (LCD). A part of ultraviolet light entering into the light incident side of the display unit may be blocked by the second polarizer 15 to avoid deterioration of the liquid crystal structure of the modulation unit 2 and the display unit 1. In addition, when the first conductive layer 22 and the second conductive layer 24 are patterned by the exposure and development techniques, the modulation unit 2 in the display unit 1 facilitates the alignment with the display unit 1, which is beneficial for the designs of the light pattern and the view angle distribution.

As in Embodiment 1, the distance between the pixel layer 13 and the backlight unit 3 of the display unit 1 is preferably 0.5 to 4 mm; pixel layer 13 and when the distance between the pixel layer 13 and the backlight unit 3 falls within the above-described range, the observer can be obtained better image quality. In this embodiment, the distance (D) between the observer's eye and the display unit 1 preferably satisfies the following Equation 2:

$$D = \left(\frac{eye}{SPP} - 1\right)\left(\frac{LC}{n_{LC}} + \frac{TFT1}{n_{TFT}} + \frac{pol.2}{n_{pol.}} + \frac{air}{n_{air}} + \frac{PDLC}{n_{PDLC}} + \frac{LGP}{n_{LGP}}\right)$$ [Equation 2]

wherein, eye, SPP, LC, $n_{Lc}$, TFT1, nTFT, pol.2, $n_{pol.}$, Air, $n_{air}$, PDLL, and $n_{PDLC}$ are defined as in Equation 1. LGP represents the thickness of the light guide plate, and $n_{LGP}$ represents the refractive index of the light guide plate.

For example, in the case that the distance between the observer's eyes is 32.5 mm, when the distance between the pixel layer 13 and the backlight unit 3 is 1.3386 mm, the distance (D) between the observer's eye and the display unit 1 is 120 mm. When the distance between the pixel layer 13 and the backlight unit 3 is 3.2036 mm, the distance (D) between the observer's eye and the display unit 1 is 4155 mm. Alternatively, in the case that the distance between the observer's eyes is 65 mm, when the distance between the pixel layer 13 and the backlight unit 3 is 1.3386 mm, the distance (D) between the observer's eye and the display unit 1 is 242 mm. When the distance between the pixel layer 13 and the backlight unit 3 is 3.2036 mm, the distance (D) between the observer's eye and the display unit 1 is 8312 mm. In detail, the values satisfying Equation 2 are summarized in Table 2 below:

TABLE 2

| D | SPP | LC | TFT1 | PDLC | pol.2 | air | LGP |
|---|---|---|---|---|---|---|---|
| 120 | 0.2479 | 0.0036 | 0.2 | 0.2 | 0.135 | 0.1 | 0.7 |
| 4155 | 0.018 | 0.0036 | 0.7 | 0.7 | 0.2 | 0.5 | 1.1 |
| 242 | 0.2479 | 0.0036 | 0.2 | 0.2 | 0.135 | 0.1 | 0.7 |
| 8312 | 0.018 | 0.0036 | 0.7 | 0.7 | 0.2 | 0.5 | 1.1 |

Unit: mm

[Embodiment 4]

Figure 4:
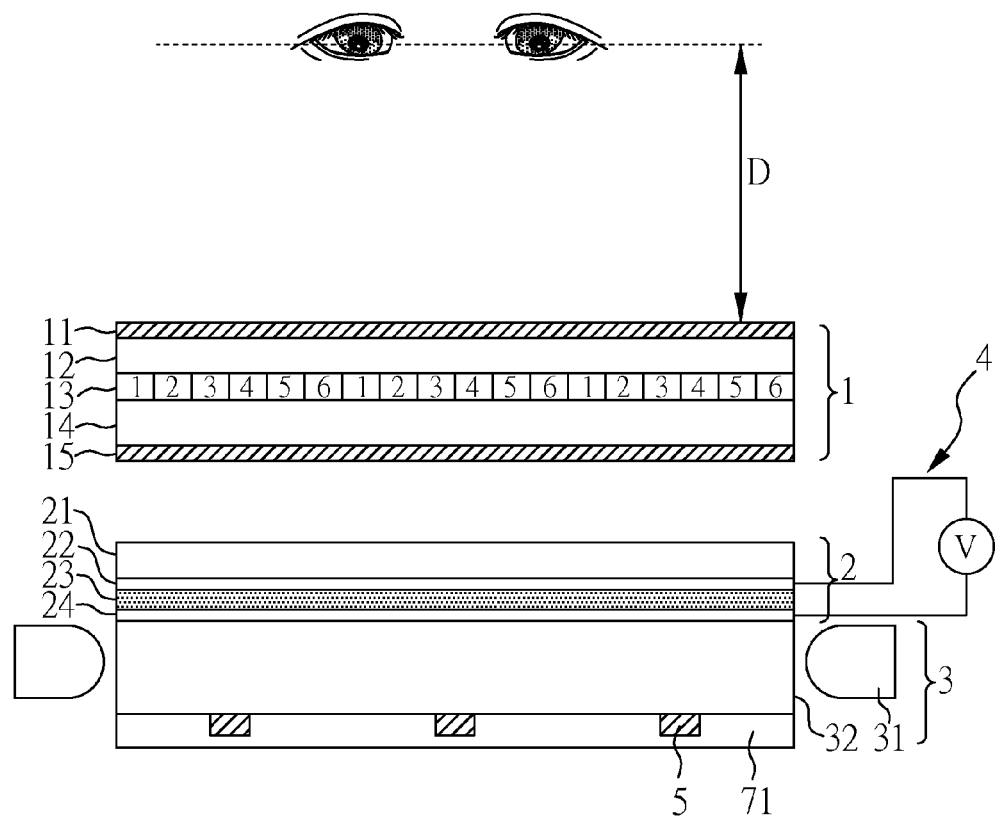
FIG. 4 shows a schematic diagram of the display device according to further another preferable embodiment of the present invention.

Refer to FIG. 4, which shows a schematic diagram of the display device according to further another preferable embodiment of the present invention. In the present embodiment, the installation of a substrate can be omitted due to the combination of the modulation unit 2 and the backlight unit 3. In detail, the modulation unit 2 sequentially comprises: a third substrate 21, a first conductive layer 22, a liquid crystal layer 23, and a second conductive layer 24, wherein the backlight unit 3 is the same as in FIG. 2A. Accordingly, the modulation unit 2 has a light entrance surface 251 and a light exit surface 221 opposite thereto, and the backlight unit 3 is attached onto the light entrance surface 251. Thus, in Embodiment 1, the fourth substrate 25 contained in the modulation unit 2 may be omitted, and a common backlight unit 32 of the light guide plate 3 is employed, to reduce the weight of the device and the cost of the substrate. In addition, the display unit 1 of this embodiment is the same as in Embodiment 1, and not repeated here.

As in Embodiment 1, the distance between the pixel layer 13 and the backlight unit 3 of the display unit 1 is preferably 0.5 to 4 mm. When the distance between the pixel layer 13 and the backlight unit 3 falls within the range described above, the observer can have better image quality. In this embodiment, the distance (D) between the observer's eye and the display unit 1 preferably satisfies the following Equation 2. For example: in the case that the distance between the observer's eyes is 32.5 mm, when the distance between the pixel layer 13 and the backlight unit 3 is 1.8386 mm, the distance (D) between the observer's eye and the display unit 1 is 164 mm. When the distance between the pixel layer 13 and the backlight unit 3 is 3.6036 mm, the distance (D) between the observer's eye and the display unit 1 is 4636 mm. Alternatively, in the case that the distance between the observer's eyes is 65 mm, when the distance between the pixel layer 13 and the backlight unit 3 is 1.8386 mm, the distance (D) between the observer's eye and the display unit 1 is 329 mm. When the distance between the pixel layer 13 and the backlight unit 3 is 3.6036 mm, the distance (D) between the observer's eye and the display unit 1 is 9275 mm. In detail, the values satisfying Equation 2 are summarized in Table 3 below:

TABLE 3

| D | SPP | LC | TFT1 | PDLC | pol.2 | air | LGP |
|---|---|---|---|---|---|---|---|
| 164 | 0.2479 | 0.0036 | 0.2 | 0.7 | 0.135 | 0.1 | 0.7 |
| 4636 | 0.018 | 0.0036 | 0.7 | 1.1 | 0.2 | 0.5 | 1.1 |
| 329 | 0.2479 | 0.0036 | 0.2 | 0.7 | 0.135 | 0.1 | 0.7 |
| 9275 | 0.018 | 0.0036 | 0.7 | 1.1 | 0.2 | 0.5 | 1.1 |

Unit: mm

[Embodiment 5]

Figures 5A, 5C:
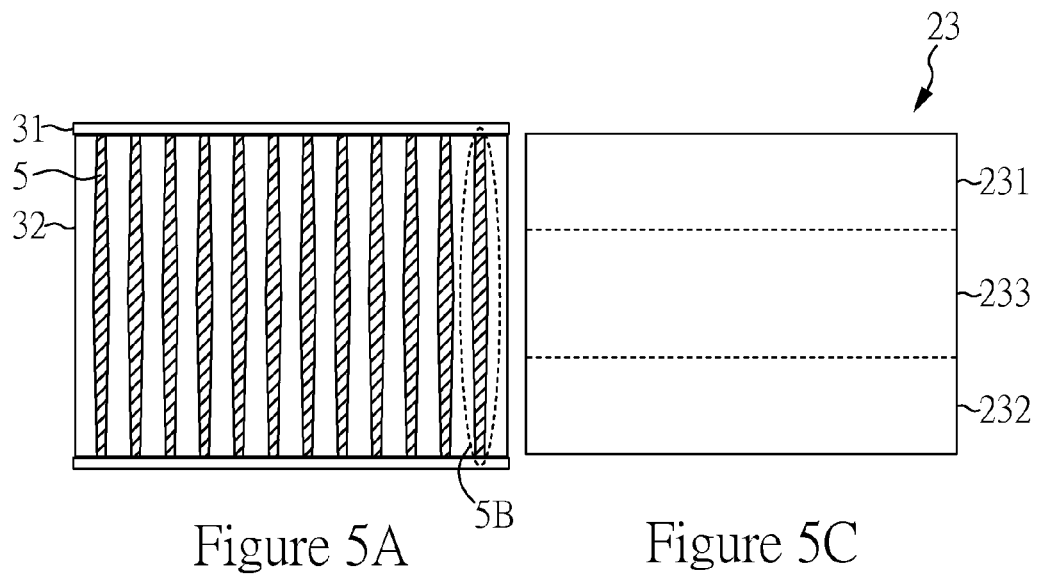
FIG. 5A shows a schematic diagram of the backlight unit according to a preferable embodiment of the present invention.
FIG. 5C shows a schematic diagram of the liquid crystal layer according to a preferable embodiment of the present invention.
Figure 5B:
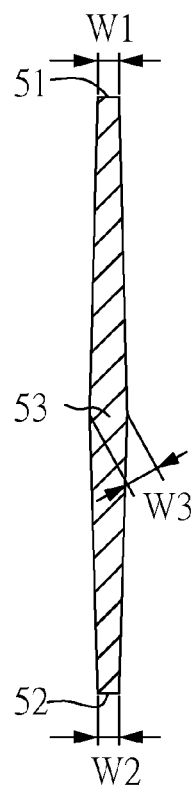
FIG. 5B shows a schematic diagram of the stripe patterns of the light guide plate according to a preferable embodiment of the present invention.

The backlight unit and the liquid crystal layer in the display device of the present invention are described in detail below. Refer to FIG. 5A, which shows a schematic diagram of the light guide plate on which a plurality of stripe patterns 5 are disposed, and the light emitting element 31 is disposed on the both sides of the light guide plate 32; wherein, as shown in FIG. 5B, each of the stripe patterns 5 has a first end 51 and a second end 52 opposite thereto. The width of the first end 51 is W1, while the width of the second end 52 is W2, and the stripe pattern 5 has a central width of W3. In this embodiment, W1 is smaller than W3, and W2 is also smaller than W3. Accordingly, the stripe pattern of the present invention has a smaller width at the first end 51 and second end 52 adjacent to the light emitting element 31, and has a larger width at the center away from the light emitting element 31. The light guide plate pattern of such a special design can improve the poor lighting efficiency of the central region of the light pattern as a result of the equalized width when light incidences into the both sides, so that the overall lighting intensity is uniform.

Also, referring to FIG. 5C, the liquid crystal layer in conjunction with the light guide plate can divide the liquid crystal layer 23 into the first region 231 having a width of W1, corresponding to a first end 51, the second region 232 having a width of W2, corresponding to a second end 52, and the third region 233 having a width of W3, corresponding to the central, respectively. Accordingly, in order to solve the visual unevenness when viewing a display device, since the distance between the two ends of the striped pattern 5 is larger, the first region 231 and second region 232 of the liquid crystal layer 23, which correspond to the smaller widths W1, W2 may be designed to have a higher haze value. Conversely, the central width W3 of the stripe pattern 5 is larger, and since the central spacing of the stripe pattern 5 is smaller, the third region 233 corresponding to the liquid crystal layer 23 may be designed to have a lower haze value.

[Embodiment 6]

Figure 6A:
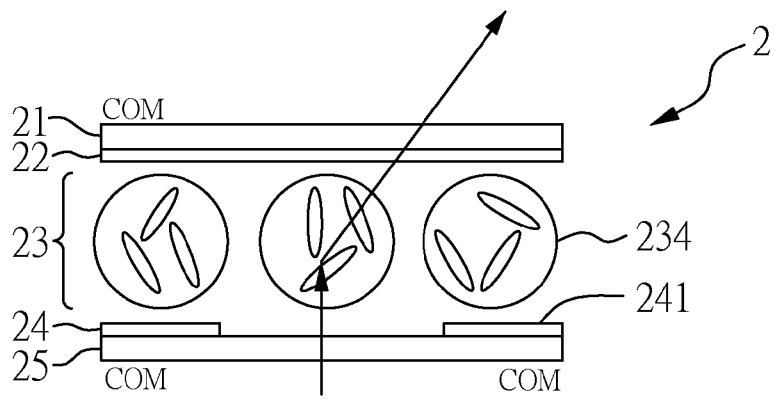
FIGS. 6A and 6C show the schematic diagrams of the modulation unit according to a preferable embodiment of the present invention.
Figure 6B:
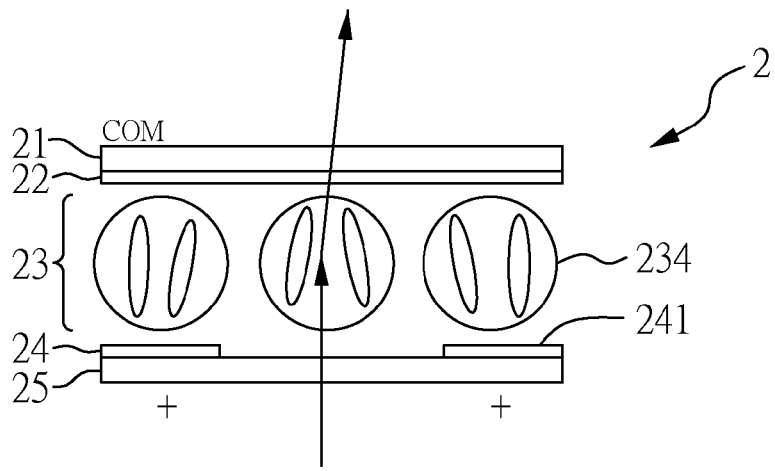
Figure 6C:
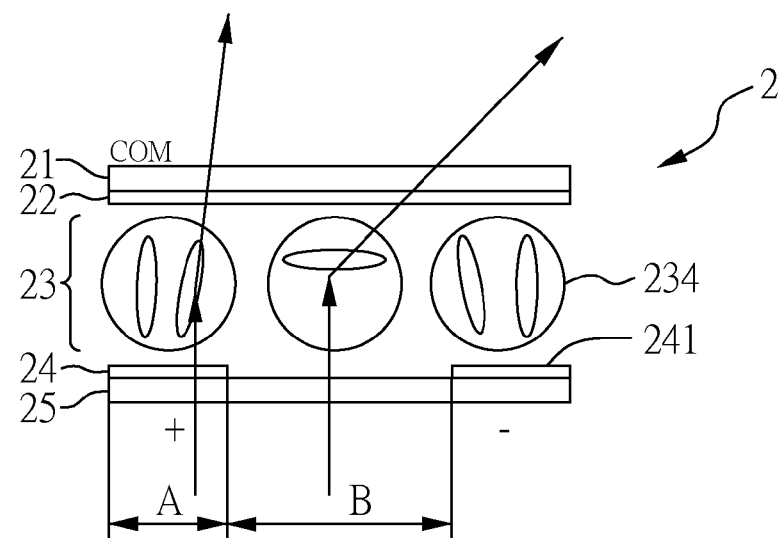

For the modulation unit 2, referring to FIGS. 6A-6C, which shows a schematic diagram of the modulation unit 2, which sequentially comprises a third substrate 21, a first conductive layer 22, a liquid crystal layer 23, a second conductive layer 24 and fourth substrate 25, wherein the liquid crystal layer 23 includes a plurality of liquid crystal units 234, and the first conductive layer 22 and the second conductive layer 24 are disposed on the two surfaces of the liquid crystal layer 23 respectively. In other words, the liquid crystal layer 23 is disposed between the first conductive layer 22 and the second conductive layer 24, and the first conductive layer 22 is used as a blanket electrode, while the second patterned conductive layer 24 is patterned to form an in-plane switching (IPS) pattern, which includes a plurality of stripe unit 241. The sum of the width A of each strip unit and the spacing B between the stripe units 241 is less than the minimum width of the stripe patterns on the light guide plate (that is, the first width W1 or the second width W2 illustrated in Embodiment 5), i.e., A+B<W1 or A+B<W2. COM represents a common voltage signal of the electrode, symbols + or − represents positive polarity or negative polarity of the electrode voltage signal with respect to the common voltage. Furthermore, the person skilled in the art can understand that the backlight unit is not necessary to be disposed at a position adjacent to the second conductive layer 24, and the backlight unit may be also disposed at a position adjacent to the first conductive layer 22.

[Embodiment 7]

A further variation of the modulation unit 2 is shown in FIGS. 7A-7D, which illustrates a schematic diagram of the modulation unit 2, which sequentially comprises a third substrate 21, a first conductive layer 22, a liquid crystal layer 23, a second conductive layer 24, a first insulating layer 252, a third conductive layer 26 and a fourth substrate 27, wherein the liquid crystal layer 23 includes a plurality of liquid crystal units 234, and the first conductive layer 22 and the second conductive layer 24 are disposed on the two surfaces of the liquid crystal layer 23 respectively. In other words, the liquid crystal layer 23 is disposed between the first conductive layer 22 and the second conductive layer 24, and the third conductive layer 26 is further disposed at the side of the second conductive layer 24, while an insulating layer is disposed between the second conductive layer 24 and the third conductive layer 26, wherein the electricity of the second conductive layer 24 and the third conductive layer 26 can be controlled independently. The first conductive layer 22 and the third conductive layer 26 are used as the blanket electrode, while the second patterned conductive layer 24 is patterned to form a fringe field switching (FFS) pattern, which includes a plurality of stripe unit 241. The sum of the width A of each strip unit and the spacing B between the stripe units 241 is less than the minimum width of the stripe patterns on the light guide plate (that is, the first width W1 or the second width W2 illustrated in Embodiment 5), i.e., A+B<W1 or A+B<W2. COM represents a common voltage signal of the electrode, symbols + or − represents positive polarity or negative polarity of the electrode voltage signal with respect to the common voltage. Furthermore, the person skilled in the art can understand that the backlight unit is not necessary to be disposed at a position adjacent to the third conductive layer 26, and the backlight unit may be also disposed at a position adjacent to the first conductive layer 22.

[Embodiment 8]

Another variation of the modulation unit 2 is shown FIGS. 7A-7D, which illustrates a schematic diagram of the modulation unit 2, which sequentially comprises a fifth substrate 29, a fourth conductive layer 28, a second insulating layer 211, a first conductive layer 22, a liquid crystal layer 23, a second conductive layer 24, a first insulating layer 252, a third conductive layer 26 and a fourth substrate 27, wherein the liquid crystal layer 23 includes a plurality of liquid crystal units 234, and the first conductive layer 22 and the second conductive layer 24 are disposed on the two surfaces of the liquid crystal layer 23 respectively. In other words, the liquid crystal layer 23 is disposed between the first conductive layer 22 and the second conductive layer 24, and the third conductive layer 26 is further disposed at the side of the second conductive layer 24, while an insulating layer is disposed between the second conductive layer 24 and the third conductive layer 26, wherein the electricity of the second conductive layer 24 and the third conductive layer 26 can be controlled independently. The forth conductive layer 28 is further disposed at the side of the first conductive layer 22, while an insulating layer is disposed between the first conductive layer 22 and the forth conductive layer 28, wherein the electricity of the first conductive layer 22 and the forth conductive layer 28 can be controlled independently. The third conductive layer 26 and the forth conductive layer 28 are used as the blanket electrode, while the first conductive layer 22 and the second patterned conductive layer 24 are patterned to form a fringe field switching (FFS) pattern, and the first conductive layer 22 and the second patterned conductive layer 24 include a plurality of stripe unit 241, respectively. The sum of the width A of each strip unit and the spacing B between the stripe units 241 is less than the minimum width of the stripe patterns on the light guide plate (that is, the first width W1 or the second width W2 illustrated in Embodiment 5), i.e., A+B<W1 or A+B<W2. COM represents a common voltage signal of the electrode, symbols + or − represents positive polarity or negative polarity of the electrode voltage signal with respect to the common voltage.

Furthermore, the person skilled in the art can understand that the backlight unit is not necessary to be disposed at a position adjacent to the third conductive layer 26, and the backlight unit may be also disposed at a position adjacent to the forth conductive layer 22.

Figure 7A:
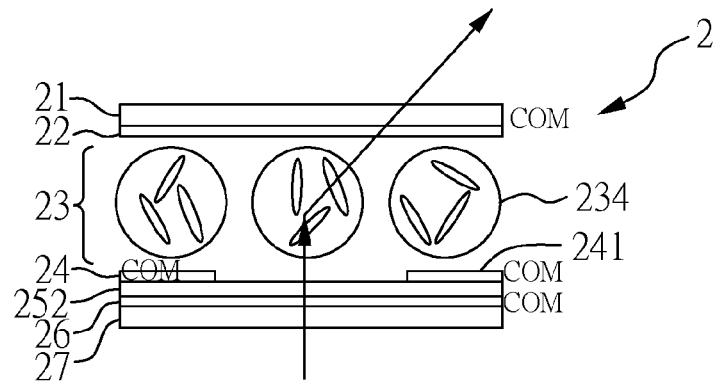
FIGS. 7A and 7D show the schematic diagrams of the modulation unit according to another preferable embodiment of the present invention.
Figure 7B:
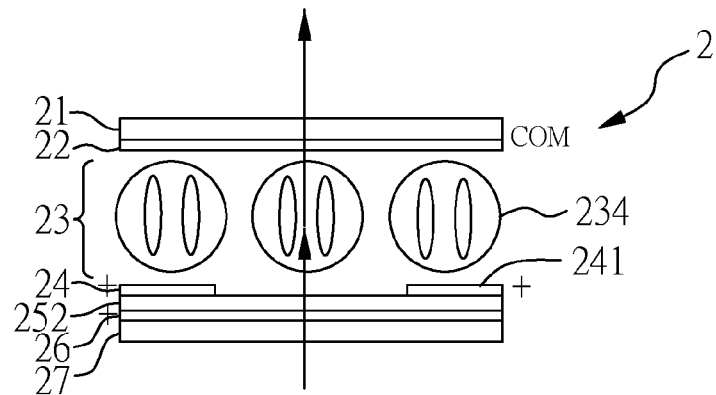
Figure 7C:
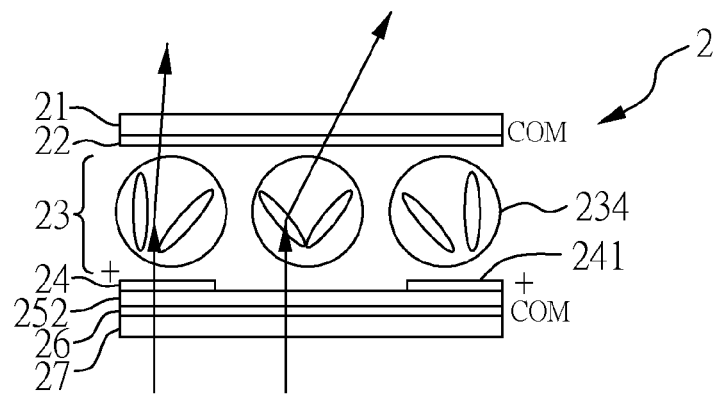
Figure 7D:
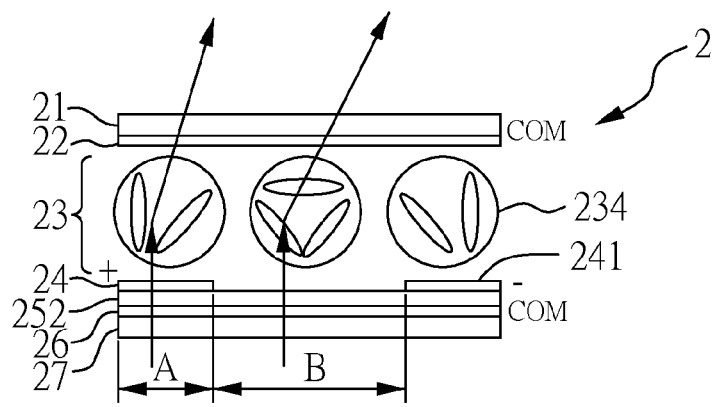

In the above-described Embodiments 6 to 8, as shown in FIGS. 6A, 7A, and 8Aa, when the display device is maintained in an equipotential state (i.e., in a power saving mode of a two-dimensional image), the liquid crystal molecules in the liquid crystal unit 234 are in directions of arbitrary distribution, and the light (as shown by arrow) travels through the liquid crystal layer 23 in a scattering state. Therefore, it has a strong scattering level, exhibiting a high haze value. As show in FIGS. 6B, 7B, and 8B, when the display device is in the vertical electric field (i.e., rendering a three-dimensional image), the liquid crystal molecules in the liquid crystal unit 234 have a vertical distribution, and the light (as shown by arrow) travels through the liquid crystal layer 23 in a penetration state. Therefore, it has a low scattering level, exhibiting a low haze value. As shown in FIG. 6C, when the display device is in the horizontal and vertical electric field states (i.e., rendering a two-dimensional image). Alternatively, as shown in FIGS. 7C and 8C, when the display device is in the horizontal and vertical electric field states of FFS (i.e., in a state showing a two-dimensional image), or as shown in FIGS. 7D and 8D, when the display device is in partially horizontal and partially vertical electric field states of a stripe and in-plane switch (FIS) (i.e., in another state showing a two-dimensional image), the liquid crystal molecules of the liquid crystal cell 234 are in a partially vertical, partially horizontal and partially inclined distribution, and the light (as shown by arrow) traveling through the liquid crystal layer 23 is partially in a penetration state and partially in a scattered state. Therefore, the scattering property and the haze value of the light are varied with the width A of each stripe unit and the spacing B between the stripe units.

Accordingly, since the time for returning to steady state from releasing a voltage by the PDLC liquid crystal layer is long, the two-dimensional and three-dimensional images of the present invention both employ a pre-charge operation mode, so that the operating voltage range is established to be ranging from one slightly lower than the threshold voltage to the operating voltage, thereby enhancing the switching speed of the two-dimensional and three-dimensional images. In addition, when it is maintained in a two-dimensional image for a long time, or a quick switching speed to a three-dimensional image is not required, the voltage can be released to enter the power saving mode that shows a two-dimensional image, thereby amplifying the operating voltage range to reduce the power consumption of the device.

According to Embodiments 5 to 8, take the following operation as an example: In the case of the first, second and third regions of the liquid crystal layer are applied with the same voltage, the region having a low haze value should be provided with a smaller electrode spacing (i.e., the spacing B between the stripe units) or a larger electrode width (i.e., the width A of the strip unit). Conversely, the region having a high haze value should be provided with a larger electrode spacing (i.e., the spacing B between the stripe units) or a smaller electrode width (i.e., the width A of the strip unit). Alternatively, in the case that the electrode width (i.e., the width A of the strip unit) and the electrode spacing (i.e., the spacing B between the stripe units) are fixed, the region exhibiting a low haze value in the liquid crystal layer should be applied with a higher electric field in the vertical direction (a voltage difference between the two sides is larger), and the region exhibiting a high haze value in the liquid crystal layer should be applied with a lower electric field in the vertical direction (a voltage difference between the two sides is smaller).

Furthermore, in addition to adjusting the haze value of the liquid crystal layer by the electrode pattern, the liquid crystal layer having a different haze value can also be realized by a non-uniform exposure. For example, in the case that the ultraviolet light irradiates the liquid crystal layer, a mask (or a layer) is placed over the liquid crystal layer, wherein the mask has a non-uniform light transmittance or a dark pattern of a uneven density; such that, after irradiated by the UV light, the region of the liquid crystal layer corresponding to the mask having the high transmittance or the dark pattern of a high density can form a high haze value due to effect of the higher ultraviolet light energy. Conversely, the region of the liquid crystal layer corresponding to the mask having the low transmittance or the dark pattern of a low density can form a low haze value due to effect of the lower ultraviolet light energy. Alternatively, in the case that the ultraviolet light irradiates the liquid crystal layer, a convex lens (or a bump) is placed over the liquid crystal layer, the condensing characteristics of the lens may result in a higher light intensity at the center and a low light intensity at the two ends, and as a result, the liquid crystal layers with different haze values can be formed as well. Furthermore, for example, in the case that UV light irradiates the two sides of the liquid crystal layer, a reflective layer is placed over the liquid crystal layer, and the liquid crystal layers with different haze values can be formed by reflecting the UV light arriving to the reflective layer and adjusting the position of the UV light and the angle of the reflective layer.

[Embodiment 9]

Figures 9A, 9C:
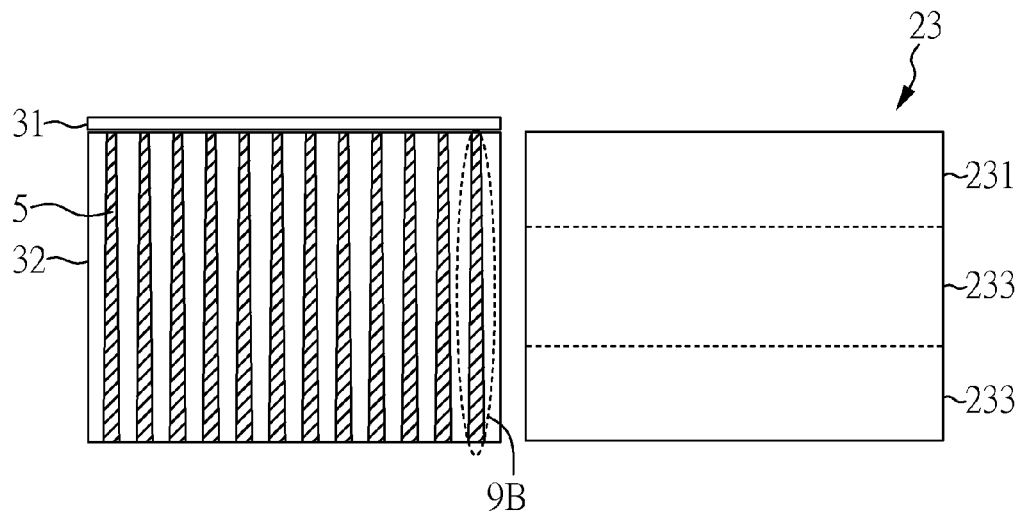
FIG. 9A shows a schematic diagram of the backlight unit according to another preferable embodiment of the present invention.
FIG. 9C shows a schematic diagram of the liquid crystal layer according to another preferable embodiment of the present invention.
Figure 9B:
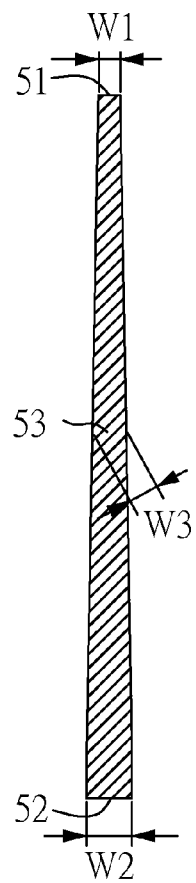
FIG. 9B shows a schematic diagram of the stripe patterns of the light guide plate according to another preferable embodiment of the present invention.

Another embodiment of the backlight unit in the display device of the present invention is described in detail below with reference to FIGS. 9A-9C. As shown in FIG. 9A, when the light emitting element 31 is provided only at one side of the light guide plate 32, a plurality of stripe patterns 5 are disposed on the light guide plate 32, as shown in FIG. 9B, and each of the stripe patterns have a first end 51 having a width of W1 and a second end 52 opposite thereto having a width of W2, while the central width of the stripe pattern 5 is W3. In this embodiment, W1 is less than W3, and W3 is less than W2. Accordingly, the stripe pattern of the present invention has a first end 51 which is adjacent to the light emitting element 31 and has a smaller width, and a second end 52 which is away from the light emitting element 31 and has a larger width W2. The light guide plate pattern of such a special design can improve the poor lighting efficiency of the central region of the light pattern as a result of the equalized width when light incidences into the single side.

Referring to FIG. 9C, as described in Embodiment 5, the liquid crystal layer in conjunction with the light guide plate may divide the liquid crystal layer 23 into the first region 231, the second region 232, and the third region 233. In order to solve the visual unevenness when viewing a display device, the first region 231, the second region 232, and the third region 233 have a haze value preferably proportional to the spacing between the stripe patterns and inversely proportional to the width W1, W2, and W3 of the stripe patterns. In other words, when the stripe patterns 5 have a larger spacing and a smaller width, the corresponding region of the liquid crystal layer preferably has a high haze value. Conversely, when the stripe patterns 5 have a smaller spacing and a larger width, the corresponding region of the liquid crystal layer preferably has a low haze value. The partition of the liquid crystal layer is not particularly limited here, and the number of partitions may also be 2, 4, 5, other integers, and so on.

[Embodiment 10]

Figure 10A:
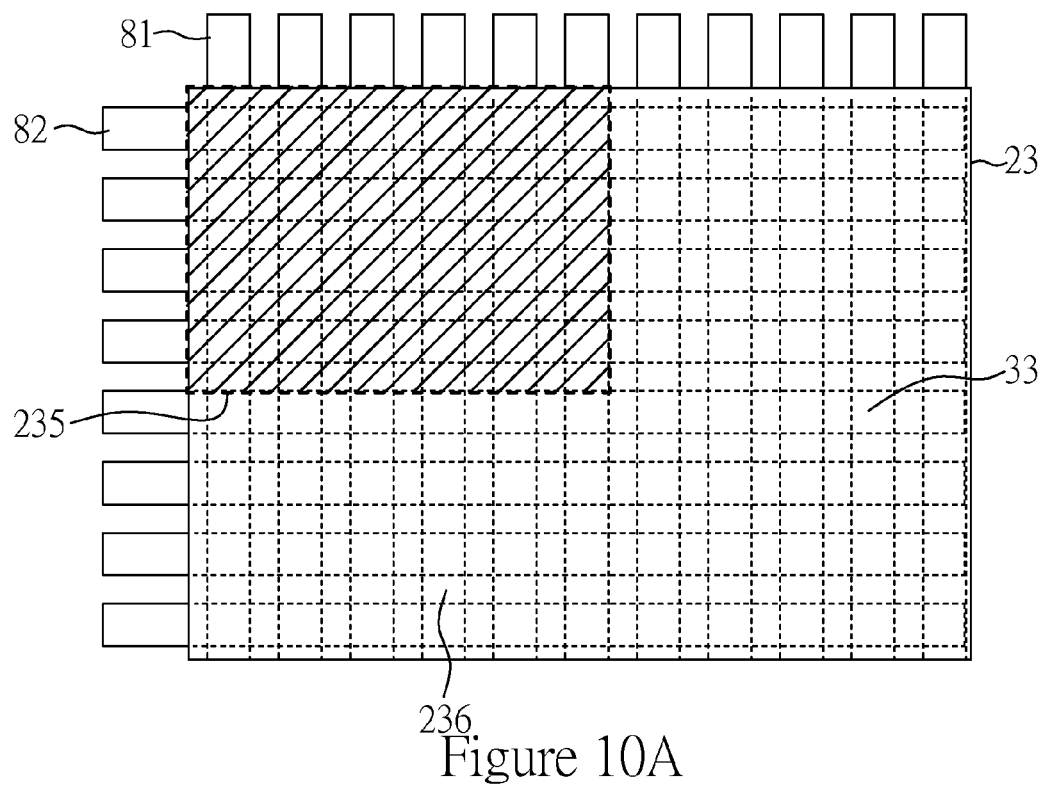
FIG. 10A shows a schematic diagram of the modulation unit according to still another preferable embodiment of the present invention.
Figure 10B:
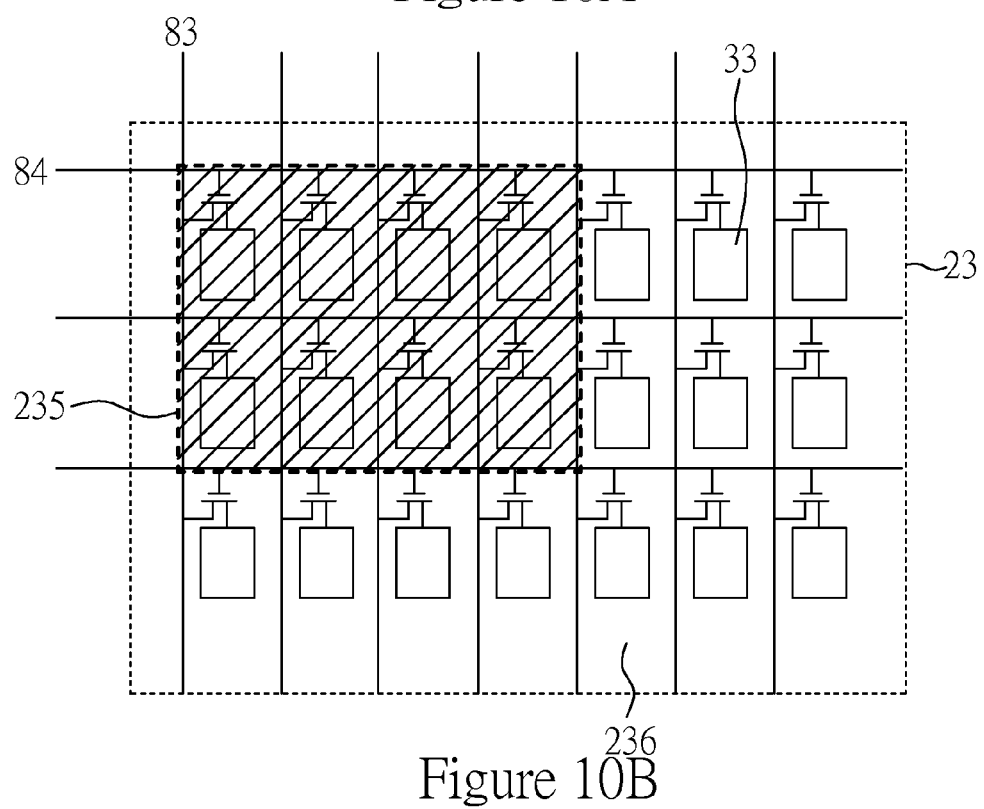
FIG. 10B shows a schematic diagram of the modulation unit according to another preferable embodiment of the present invention.

Alternatively, a plurality of conductive layers in the modulation unit 2 may constitute an active matrix or a passive matrix. FIG. 10A shows a schematic diagram of a passive matrix, which has a parallel strip-shaped cathode 81, an organic layer (not shown), and a parallel strip-shaped anode 82, wherein the cathode 81 and the anode 82 are orthogonal to each other, to form a drive unit 33 at each intersection. In addition, FIG. 10B shows a schematic diagram of an active matrix, which has a planar cathode, an organic layer, and a planar anode (not shown), wherein a thin film transistor (TFT) array covers the planar anode, comprising the data line 83 and the scan lines 84, to control each driving unit 33. In this case, the active matrix or passive matrix are employed to achieve the liquid crystal layer 23 having different haze values to allow simultaneous presentation of the two-dimensional region 235 and the three-dimensional region 236.

While the invention has been shown and described with reference to certain exemplary embodiments thereof, it will be understood by those skilled in the art that various changes in form and details may be made therein without departing from the scope of the invention as defined by the appended claims.

What is claimed is:

1. A display device, comprising:
a display unit comprising a pixel layer;
a backlight unit; and
a modulation unit disposed between the display unit and the backlight unit;
wherein the modulation unit comprises a plurality of conductive layers and a liquid crystal layer disposed between the plurality of conductive layers,
wherein the liquid crystal layer comprises a polymer dispersed liquid crystal or a polymer stabilized liquid crystal, and the liquid crystal layer has a first region, a second region and a third region;
wherein one of the plurality of the conductive layers comprises a plurality of stripe units, and the stripe units have a width inversely proportional to a haze value of the first region, the second region and the third region.

2. The display device of claim 1, wherein the backlight unit comprises: a light emitting element and a light guide plate having a first surface and a second surface opposite to the first surface, wherein the first surface is adjacent to the modulation unit, and a plurality of stripe patterns are disposed on the second surface of the light guide plate.

3. The display device of claim 2, wherein a reflective layer is disposed on the second surface of the light guide plate and covers the second surface and the plurality of stripe patterns.

4. The display device of claim 2, wherein a reflective layer is provided on the plurality of stripe patterns and covers the plurality of stripe patterns.

5. The display device of claim 2, wherein the light emitting element is disposed at least one side of the light guide plate.

6. The display device of claim 5, wherein the light emitting element is disposed on the both sides of light guide plate, and each of the stripe patterns have a first end and a second end opposite to the first end, in which the first end has a first width, and the second end has a second width, and each of the stripe patterns have a central width; wherein each of the first width and the second width is less than the central width respectively.

7. The display device of claim 5, wherein the light emitting element is disposed on the single side of the light guide plate, and each of the stripe patterns have a first end and a second end opposite to the first end, in which the first end has a first width, and the second end has a second width; wherein the first width is less than the second width.

8. The display device of claim 7, wherein the first region and the second region have a haze value inversely proportional to the first width and the second width respectively.

9. The display device of claim 2, wherein the light emitted from the light emitting element incidents to the light guide plate to provide a planar light source, and the backlight unit further comprises a barrier layer disposed on the first surface of the light guide plate.

10. The display device of claim 2, wherein the light emitted from the light emitting element incidents to the light guide plate to provide a planar light source, and the modulation unit further comprises a barrier layer disposed between the backlight unit and the liquid crystal layer.

11. The display device of claim 2, wherein in the display unit, a distance between the pixel layer and the backlight unit is 0.5 mm to 4 mm.

12. The display device of claim 2, wherein the display unit and the modulation unit use a common substrate.

13. The display device of claim 1, wherein one of the plurality of conductive layers is a blanket electrode.

14. The display device of claim 13, wherein one of the plurality of conductive layers are patterned electrodes.

15. The display device of claim 14, wherein an insulating layer is disposed between the blanket electrode and the patterned electrodes.

16. A display device, comprising:
a display unit comprising a pixel layer;
a backlight unit comprising: a light emitting element and a light guide plate; and
a modulation unit disposed between the display unit and the backlight unit;
wherein the modulation unit comprises a plurality of conductive layers and a liquid crystal layer disposed between the plurality of conductive layers;
wherein light guide plate has a first surface and a second surface opposite to the first surface, wherein the first surface is adjacent to the modulation unit, and a plurality of stripe patterns are disposed on the second surface of the light guide plate;
wherein the light emitting element is disposed on the both sides of light guide plate, and each of the stripe patterns have a first end and a second end opposite to the first end, in which the first end has a first width, and the second end has a second width, and each of the stripe patterns have a central width; wherein each of the first width and the second width is less than the central width respectively;
wherein the liquid crystal layer comprises a polymer dispersed liquid crystal or a polymer stabilized liquid crystal, the liquid crystal layer has a first region, a second region and a third region, and the first region, the second region and the third region have a haze value inversely proportional to the first width, the second width and the central width respectively.

17. A display device, comprising:
a display unit comprising a pixel layer;
a backlight unit comprising: a light emitting element and a light guide plate; and
a modulation unit disposed between the display unit and the backlight unit;
wherein the modulation unit comprises a plurality of conductive layers and a liquid crystal layer disposed between the plurality of conductive layers;
wherein the liquid crystal layer comprises a polymer dispersed liquid crystal or a polymer stabilized liquid crystal, and the liquid crystal layer has a first region and a second region;
wherein the light guide plate has a first surface and a second surface opposite to the first surface, wherein the first surface is adjacent to the modulation unit, and a plurality of stripe patterns are disposed on the second surface of the light guide plate;
wherein the light emitting element is disposed on the single side of the light guide plate, and each of the stripe patterns have a first end and a second end opposite to the first end, in which the first end has a first width, and the second end has a second width; wherein the first width is less than the second width;
wherein one of the plurality of the conductive layers comprises a plurality of stripe units, and the stripe unit have a width inversely proportional to a haze value of the first region and the second region.

* * * * *